May 21, 1946.  C. B. LIVERS  2,400,587
SELF-ENERGIZING HYDRAULIC WHEEL BRAKE SYSTEM
Filed June 26, 1943 3 Sheets-Sheet 3
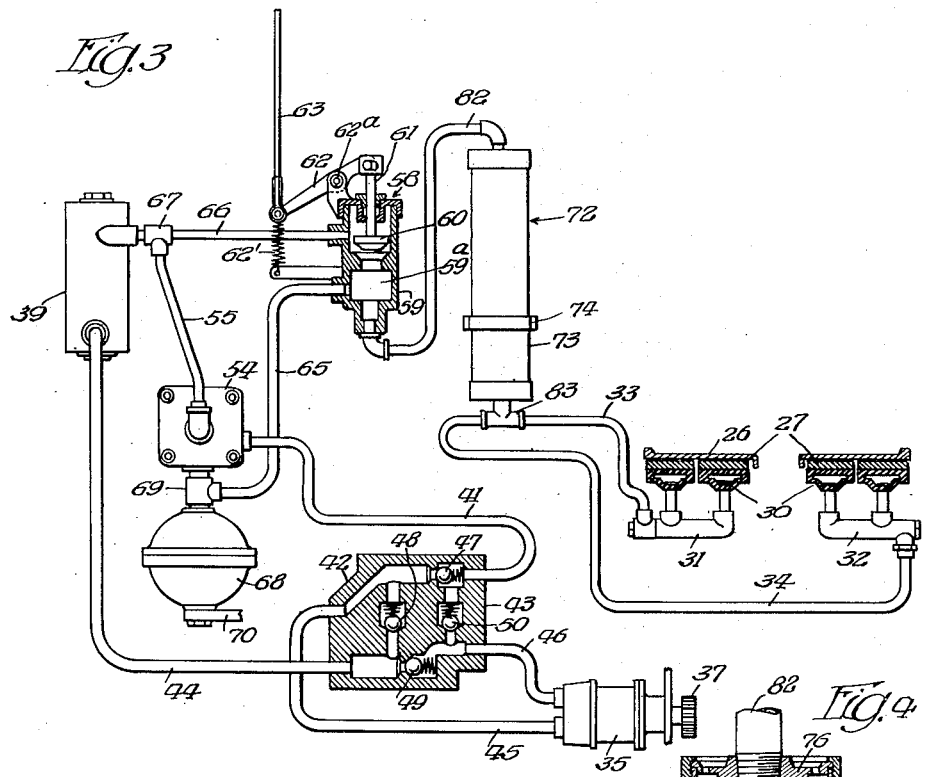
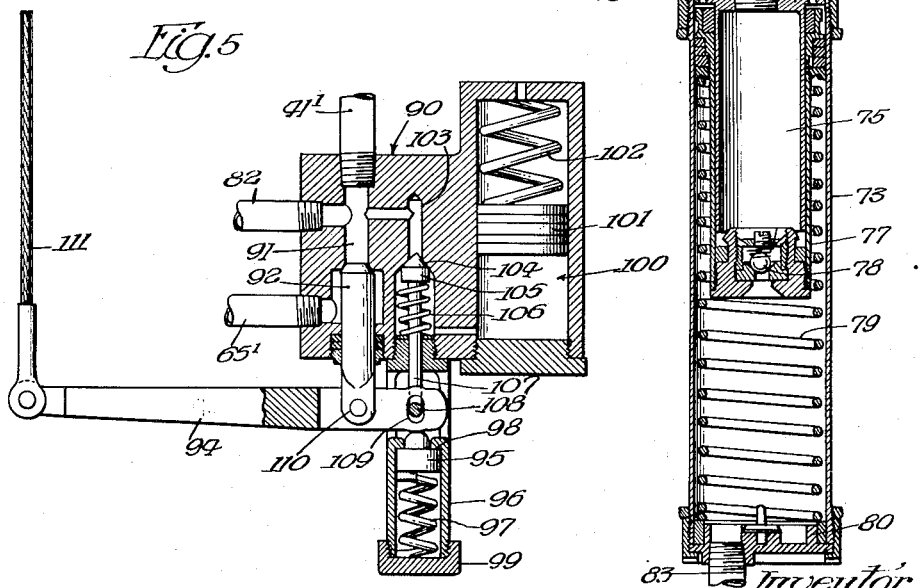
Inventor
Carlos B. Livers
By Fred Gulach
his Atty Patented May 21, 1946

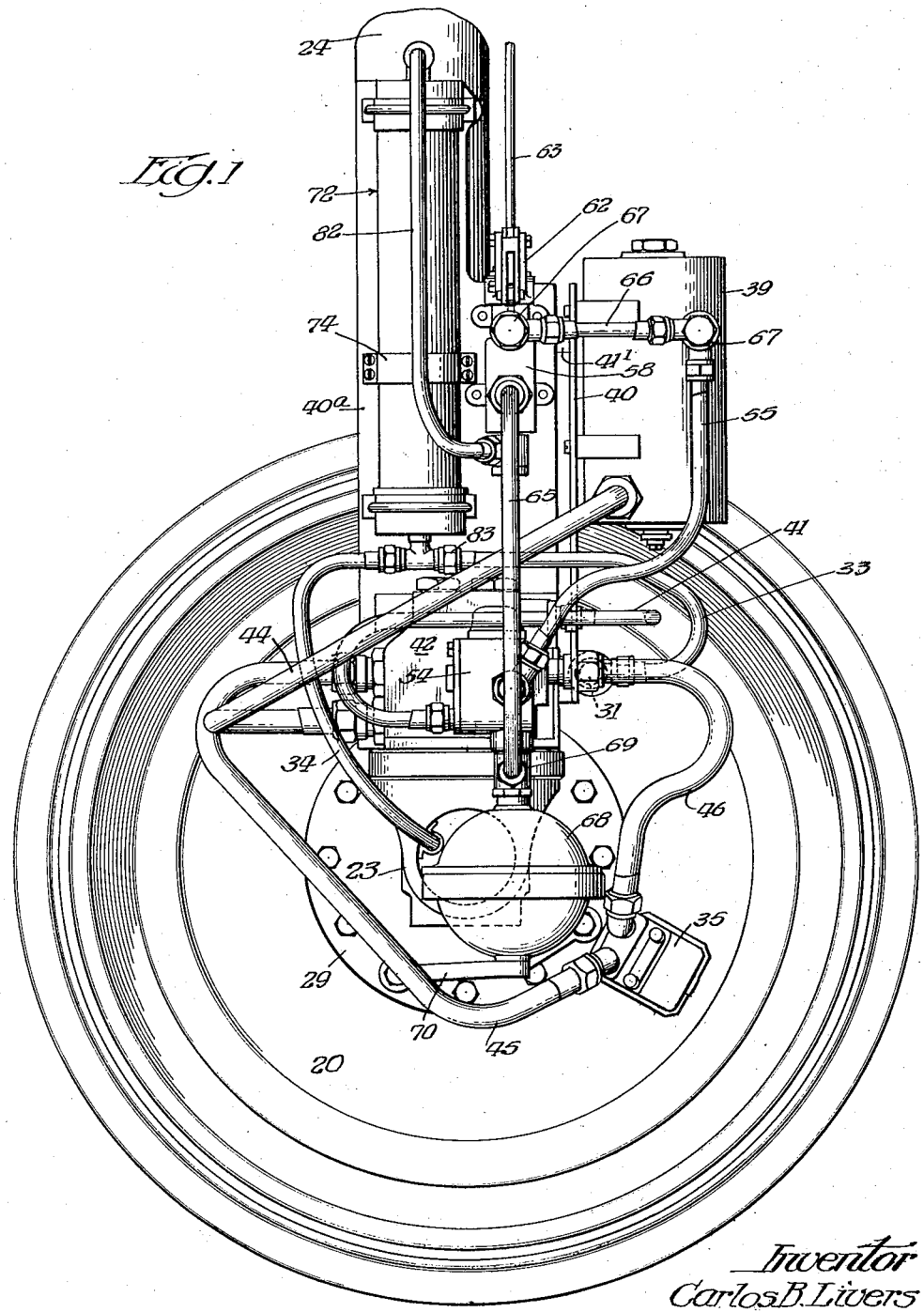

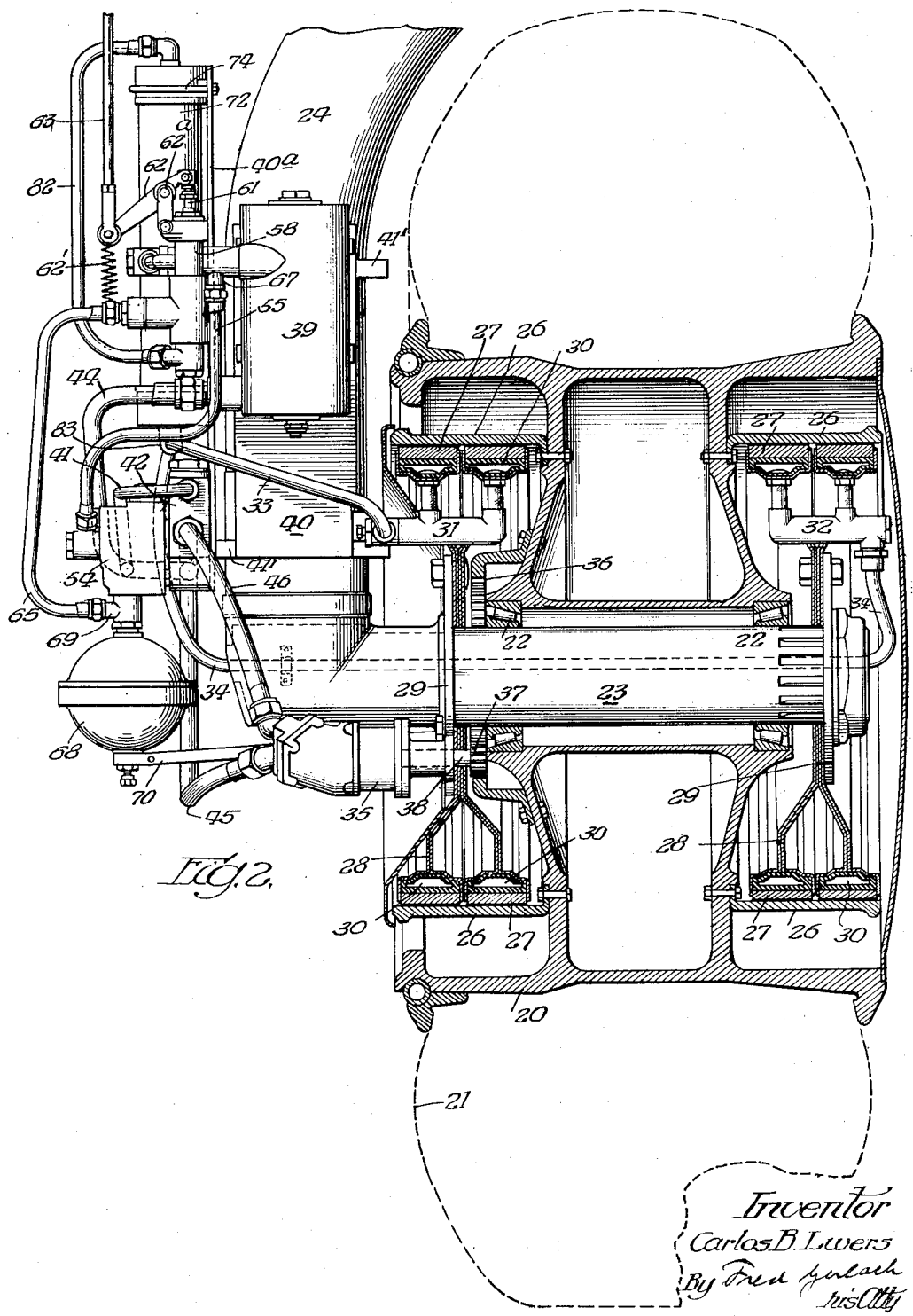

2,400,587

UNITED STATES PATENT OFFICE 2,400,587

SELF-ENERGIZING HYDRAULIC WHEEL BRAKE SYSTEM

Carlos B. Livers, San Diego, Calif., assignor to Consolidated Vultee Aircraft Corporation, San Diego, Calif., a corporation of Delaware Application June 26, 1943, Serial No. 492,341

10 Claims. (Cl. 244—111)

The invention relates to self energizing hydraulic brake systems.

One object of the invention is to provide a self contained wheel driven hydraulic system for the application of friction brakes to the landing wheels of aircraft.

Another object of the invention is to provide a hydraulic brake system which is adapted for use on landing-wheels of aircraft in which the landing wheels are mounted on disappearing struts and in which the elements are compactly or unitarily combined on the strut at or near the axle of the wheel and are controllable by the pilot at a remote point through a rod or cable so that lengthy lines of tubing for the hydraulic fluid on military aircraft are eliminated and the vulnerability to damage by gun fire in combat is lessened.

Other objects of the invention will appear from the detailed description.

The invention consists in the several novel features which are hereinafter set forth and more particularly defined by claims at the conclusion hereof.

In the drawings:

Fig. 1 is a side elevation of an airplane landing-wheel with a hydraulic brake system embodying the invention.

Fig. 2 is a rear elevation, parts being shown in section.

Fig. 3 is a diagrammatic view illustrating the hydraulic connections between the several parts of the system.

Fig. 4 is a section of the debooster.

Fig. 5 is a section illustrating a modified form of the valve for controlling the application of the brakes and an associated accumulator.

The invention is exemplified with a ground wheel 20 which is usually provided with a pneumatic tire 21 and is journaled on roller bearings 22 which are mounted on a hollow non-rotatable axle 23. The axle 23 is carried by a folding strut 24 which is usually pivoted in the wing of an airplane and operable to swing the wheel into a pocket in or in folded relation to the wing, as well understood in the art. The axle 23 is fixedly secured to the lower end of the strut 24. Brake-drums 26 are bolted to the sides of the body of wheel 20, respectively, and are adapted to be internally and frictionally engaged by brake-shoes or elements 27 which are movable radially in annular guides on disk-structures 28 which are fixedly secured to flanges 29 on the axle 23. The brake elements 27 are operable to engage the brake drums 26 by hydraulic fluid under pressure in flexible tubes 30, which when fluid is introduced therein under pressure, will force the brake elements 27 into frictional engagement with the internal peripheries of the brake-drums 26 and when fluid is exhausted, will release them from the drums to permit free rotation of the wheel. A pair of tubes 30 and associated brake-shoes are provided for each brake-drum. A fitting 31 is provided with branches connected to the pair of expansible tubes 30 at one side of the wheel and to a pipe 33 for delivering fluid under pressure to and exhausting the fluid from said pair of tubes. A fitting 32 is connected by branches with the pair of expansible tubes at the other side of the wheel and to a pipe 34 which extends through the hollow axle for delivering fluid under pressure to and exhausting the fluid from said pair of pipes. The fluid through pipes 33 and 34 is simultaneously controlled for the application and release of the brake elements on both sides of the wheel.

The present invention provides a hydraulic brake system for landing-wheels for aircraft in which the pump is driven from the landing-wheel for energizing the hydraulic fluid, a reservoir for the fluid, a manually controlled remote control valve, a uni-directional flow valve, an accumulator and a debooster for lowering the pressure of the fluid flowing from the control valve to the expansible tubes 30 which are all mounted on and closely associated with the lower end of the strut and the axle and around the landing-wheel, and whereby the actuation of the brakes is controlled by a mechanical connection, such as a rod or cable, from a brake pedal accessible to the pilot, so that lengthy lines of tubing for the fluid are avoided.

A reservoir 39 contains a supply of suitable hydraulic fluid and is mounted on a plate 40 which is fixedly secured by straps 41' to the rear side of the landing-wheel strut 24. The hydraulic fluid is energized for the operation of the brake system by a rotary piston pump 35, the casing of which is fixed to and supported by the flange 29 on the non-rotatable axle 23. This pump is adapted to be driven by power from the landing wheel 20 through an internally toothed gear ring 36 which is fixedly secured to the inner side of the body of wheel 20, and a pinion 37 which constantly meshes with said gear and is fixed to the drive shaft 38 of pump 35. A uni-directional flow valve 42 is connected by a tube 44 to receive fluid from the reservoir 39. The casing of the pump 35 is connected by tubes 45 and 46 to the casing 43 of the valve 42 for the uni-directional discharge of the fluid through a tube 41 while the pump is rotating in either direction. Check valves 47, 48, 49 and 50 in the casing 43 permit the fluid from the reservoir to be circulated through the pump in opposite directions and uni-directionally discharge it to the tube 41. The casing of valve 42 is mounted on a plate 40ª which is suitably secured to the outer side of the landing-wheel strut 24.

The fluid discharged from the constant direction flow valve 42 flows through tube 41 to an unloading valve 54 which is mounted on the outer side of the casing of valve 42. This unloading valve is connected to deliver fluid via a tube 65 to a manually controlled valve 58 and is adapted to by-pass fluid in excess of a predetermined pressure through a tube 55 to the reservoir 39. Valve 54 may be of any suitable construction and is usually of the spring-loaded type which remains closed until the pressure of the fluid from tube 41 exceeds a predetermined minimum and then opens to by-pass the excess through pipe 55 to the reservoir 39.

The flow of fluid under pressure through tubes 33 and 34 to the expansible flexible tube 30 is controlled by the manually controlled valve which is generally designated 58 and comprises a casing 59 fixed to the mounting plate 40ª at the outer side of the strut 24. Casing 59 is provided with a chamber 59ª. Tube 65 delivers fluid under pressure from the unloading valve 54 to the chamber 59ª in the casing 59. The chamber 59ª communicates with a tube 66 for returning the fluid to the reservoir 39 when the closure member 60 of valve 58 is open. Tube 55, which by-passes the excess of fluid from the unloading valve 54 and return tube 66 from valve 58 are connected to a single fitting 67 which communicates with and delivers the fluid from tubes 55 and 66 into the upper portion of the reservoir 39. Closure member 60 is carried by a stem 61 which is slidable in the casing 59 and when closed against its seat will cut off the return of fluid from casing 59 via tube 66 to the reservoir 39. A lever 62 is pivoted to a lug 62ª which is fixed to the top of casing 59, is shiftable by a control element such as a bar 63 or a cable which has a suitable connection to a brake control pedal (not shown) which is located where it is accessible to the pilot. A spring 62' is applied to lever 62 and holds valve member 60 open until the bar 63 is operated to shift said lever to hold said member 60 closed so it will cut off the flow of fluid from valve 58 via pipe 66 to the reservoir 39.

A T-fitting 69 is included in the pipe 65 between the unloading valve 54 and the control valve 58 and said fitting communicates with a diaphragm-type expansion chamber 68 which reduces the surging of the fluid flowing through pipe 65 to the control valve 58. Expansion chamber 68 is supported by a metallic strap 70 from the flange 29 on the wheel axle 23.

The lower end of the chamber 59ª in valve casing 59 is connected by a tube 82 to the upper end of a debooster 72 whereby the pressure of the fluid for inflating the flexible tubes 30 will be reduced, for example from 400 lbs. p. s. i. to 190 lbs. p. s. i. The debooster comprises an outer cylinder 73 which is secured by bands 74 to the outer side of supporting plate 40ª, an inner stationary cylinder 75; a head 76 at its upper end; a floating piston 77 between the inner cylinder 75 and the outer cylinder 73; a check valve 78 in the lower end of piston 77; and a spring 79 between the head 80 in the lower end of cylinder 73 and the floating piston. Pipe 82 communicates with the lower end of the chamber 59ª in the casing 59 of control valve 58 and is connected to head 76 which communicates with the stationary cylinder 75. Tubes 33 and 34 are both connected to a fitting 83 which is connected to head 80 of the debooster and said fitting communicates with the lower portion of the chamber in the cylinder 73. High pressure fluid delivered into the stationary cylinder 75 moves the floating piston 77 against the force of spring 79 and produces a lower pressure and greater volume of flow in the fluid discharged from the debooster by the floating piston with the ratio to pressure inversely proportional to the area of the cylinder in the floating piston and the area of the cylinder 73, so that fluid under the desired pressure for actuating the brakes will be delivered to tubes 30.

When the airplane is traveling and wheel 20 is rotated by contact with the ground in either direction, the fluid through the constant direction flow valve 42 will be delivered under pressure through tube 41 to the unloading valve 54. The fluid up to the predetermined pressure permitted by the unloading valve will flow via tube 65 into the chamber 59ª in casing 59 of the control valve 58 and will also flow to the expansion chamber 68. When valve 58 is open, fluid from chamber 59ª will flow through tube 66 and fitting 67 to the reservoir 39. When the pilot desires to apply the brakes, he will, through the usual pedal, exert a pull on the element 63 to shift lever 62 and seat the closure member 60 to cut off the flow of fluid from valve 58 to the reservoir 39. The fluid will then flow from chamber 59ª of the control valve through tube 82 into the upper end of the debooster cylinder 72. This fluid will shift the floating piston 77 in the cylinder 73 and the latter, acting against the force of spring 79, will force fluid through the fitting 83, tubes 33 and 34 and fittings 31 and 32 into the flexible tubes 30 to force the brake elements 27 against the brake drum 26. The excess fluid, if any, will be by-passed from unloading valve 54 via tube 55 and fitting 67 to the reservoir 39. The brakes will remain applied until the operator releases the brake pedal when the spring 62' will shift lever 62 to open the closure member 60 of the control valve 58. Fluid from chamber 59ª will then flow through tube 66 and fitting 67 to the reservoir 39. The spring 79 will then retract the floating piston 77 to its normal position. The pressure of the fluid in the cylinder 73 around the floating piston will be reduced so that the pressure in the flexible tubes 30 will release the brake elements from the brake drums.

In the form of the invention illustrated in Fig. 5, an unloading valve is dispensed with and a piston-type accumulator is provided in the casing of the control valve. A casing 90 is supported from the mounting plate 40ª and is provided with a chamber 91. A tube 41' delivers fluid from the casing 43 of the uni-directional valve 42 into chamber 91 in casing 90. A pipe 65' is connected to deliver fluid from chamber 91 to the reservoir 39. A pipe 82 is connected to deliver fluid from chamber 91 to the debooster 72. A slidable valve 92 is adapted to close against a seat in chamber 91 to cut off the flow of fluid from chamber 91 to tube 65' and the reservoir 39. The inner end of valve 92 is exposed to pressure in the chamber 91 so that said valve will be held normally open for the flow of fluid from tube 41' through chamber 91 and tube 65' to the reservoir without applying the brakes. A lever 94 is pivoted to the outer end of the stem of valve 92. The outer end of lever 94 is adapted to fulcrum on a spring-loaded abutment 95 to cause said lever to swing and close valve 92. Abutment 95 is slidably mounted in a tubular head 96 which is screw-threaded to the casing 90. A spring 97 normally holds abutment 95 against a shoulder 98 in head 96 and is held in the head by a cap 99. The lever 94 extends into a slot in the head 96. The spring 97 is of sufficient force to hold the abutment 95 so that the lever 94 will fulcrum thereon when the lever is shifted to close the valve 92 against the pressure of fluid in the chamber 91. When valve 92 is closed, the flow from casing 90 to the reservoir 39 will be cut off and the fluid will flow from chamber 91 through tube 82' to the debooster 72 for the application of the brakes.

Casing 90 is provided with a cylindrical accumulator chamber 100 in which is slidably mounted a piston 101 which is loaded by a spring 102. The chamber 100 is adapted to retain a sufficient volume of fluid for the application of the brakes while the airplane is parked or the pump 35 is not being operated from the ground-wheel 20. A duct 103 is adapted to establish communication between chambers 91 and 100 for the flow of fluid into the accumulator chamber 100 from the chamber 91 while the pump is in operation and from the accumulator chamber to chamber 91 for the application of the brakes when the pump is not in operation. A valve seat 104 is provided in the duct 103 for a check valve 105 which is held normally closed against said seat by a spring 106. The outer end of the stem 107 of check valve 105 has a pin 108 which extends into an elongated slot 109 in lever 94 adjacent the abutment 95. After the lever 94 has been shifted to close valve 92 and continued movement is imparted to the lever, it will fulcrum on the pin 110 which connects the lever to valve 92, and the inner end of said lever will shift the abutment 95 against the force of spring 97. After the lost-motion in the slot 109, one end of said slot will engage the stem 107 and open the check valve 106 against the force of spring 106 to permit the fluid from the accumulator chamber 100 to exhaust through duct 103 into chamber 91 and thence through tube 82' to the debooster for the application of the brakes.

Lever 94 is connected by cable 111 to the usual brake pedal. The cable normally is not under tension so that the fluid under pressure from pump 35 through tube 41' is being delivered through the chamber 91, valve 92 will be held open and the fluid will be returned via tube 65' to the reservoir 39. When the valve is closed, fluid will be forced through the duct 103 around check-valve 105 into the accumulator cylinder 100 until the latter is loaded. The check-valve 105 will retain the load in the cylinder until lever 94 is shifted to open said valve.

The operation of the embodiment of the invention last described will be as follows: Normally, the cable 111 will be relaxed and valve 92 will be held open when fluid is forced through tube 41' to the chamber 91 of the control valve 58 by the pump when the latter is operated by the ground-wheel. The inner end of lever 94 will then fulcrum on abutment 95 and permit valve 92 to open. When the pilot desires to apply the brakes while the pump 34 is being driven from the ground wheel, he will apply sufficient tension through the brake pedal to the cable 111 to cause lever 94 to fulcrum on abutment 95 and shift the connecting pin 110 until valve 92 is fully seated. The fluid under pressure from the pump entering the chamber 91 through tube 41' will flow through tube 82' to the debooster and cause it to operate the floating piston 77 for setting the brakes, and fluid will also open check-valve 105 and load the accumulator chamber. If the pressure of the fluid in chamber 91 becomes excessive, the fluid pressure exerted on the inner end of valve 92 will unseat said valve and permit the excess fluid to be by-passed through tube 65' to the reservoir. The spring-abutment 95 will permit the inner end of lever 94 to be shifted by said valve.

When the airplane is at rest on the ground and the pump 35 is not being driven from the ground wheel, the brakes can be set by applying an additional pull on the cable 111 to force lever 94 to seat valve 92 and then imparting a continuing stroke to said lever while it is fulcrumed on pin 110. During the additional stroke, abutment 95 will be shifted against the force of spring 97 until the lost-motion in slot 109 has been taken up and then the lever will shift the stem 107 to open check-valve 105. Fluid from the cylinder 100 will then be discharged by the piston 101 as it is impelled by spring 102, and flow through duct 103 and around check-valve 105 through the tube 82' to the debooster for setting the brakes. When the brakes are to be released, the cable 111 will be relaxed to release lever 94 and unseat valve 92 so that the fluid from the debooster can be discharged through chamber 91 and tube 65' to the reservoir 39. In this connection the cable 111 can be selectively operated to control the setting of the brakes while the pump is in operation or from the fluid in the accumulator when the pump is idle, the tension on the cable holds the valve 92 tightly seated, no unloading valve is necessary, and the accumulator and control valve are combined in a compact unit.

The invention exemplifies a hydraulic brake system for landing-wheels of aircraft in which the brake-shoes are hydraulically controlled to apply friction on the wheel, the fluid from a reservoir is energized by a pump driven from the landing-wheel, the valve for controlling the braking and all of the inter connections between the pump, reservoir and valve are closely associated with and supported from the strut which carries the landing-wheel, and the control valve is operable by a mechanical connection from the brake pedal which is remotely located in the fuselage within reach of the pilot so that hydraulic connections for remote control are dispensed with. The invention also exemplifies a hydraulic brake system which is composed of instrumentalities which are adapted for location on the strut and in close association with the strut and the wheel.

The invention is not to be understood as restricted to the details set forth since these may be modified within the scope of the appended claims without departing from the spirit and scope of the invention.

Having thus described the invention, what I claim as new and desire to secure by Letters Patent is:

1. In a landing gear for an airplane, a strut, a mounting wheel carried on an axle which is rotatably supported by the lower end of the strut, an element for engaging a brake drum on the landing wheel, a rotary pump adjacent the axle outside of the wheel, gearing driven from the landing wheel for driving the pump, a plate structure on the strut, a reservoir for fluid mounted on the plate structure, connections between the pump and the reservoir, a unidirectional flow valve connected to the pump and to the reservoir and mounted on the plate structure, an unloading valve connected to and mounted on said unidirectional flow valve and connected to the reservoir, valve means for controlling the flow of fluid for actuating the brake and mounted on the plate structure and a device for manual remote control for the valve means.

2. In a landing gear for an airplane, a strut, an axle non-rotatably supported by the lower end of the strut, a landing wheel carried on the axle and provided with a brake drum, gearing driven from the landing wheel for driving the pump, a plate structure mounted on the strut, a reservoir for fluid mounted on the plate structure, connections between the pump and the reservoir, a unidirectional flow valve connected to the pump and to the reservoir and mounted on the plate structure, an unloading valve connected to and mounted on said unidirectional flow valve and connected to the reservoir, a valve for controlling the flow of fluid for actuating the brake and mounted on the plate structure, a debooster connected to receive fluid from the brake valve and mounted on the plate structure, and a device for remote control for actuating the valve.

3. In a landing gear for an airplane, a strut, an axle non-rotatably supported by the lower end of the strut, a landing wheel carried on the axle and provided with a brake drum on each side thereof, hydraulically shiftable brake elements for engaging the drums, respectively, mounted on the axle, a rotary pump supported from the axle outside of the wheel, gearing for driving the pump from the wheel, a valve for controlling fluid for shifting the brake elements, fluid connections for conducting fluid controlled by the valve for the operation of said elements, connections between the pump and the valve, one of which fluid connections extends through the axle, said valve, connections and pump being mounted on the strut, and a manually shiftable control connection for actuating the valve.

4. In a landing gear for aircraft; a strut on an air plane, a landing wheel carried by the lower end of and supported by the strut; and a braking element for the landing wheel; self-energizing hydraulic mechanism for operating said element comprising, a reservoir for fluid, a pump adjacent the lower end of the strut, gearing driven by the landing wheel for driving the pump, a brake control valve, a connection between the pump and the valve, and a connection for returning excess fluid from the pump to the reservoir, all of said mechanism being mounted on the strut; and manually operable remote control means for the brake control valve for controlling the actuation of the braking element.

5. In a landing gear for aircraft; a strut on an airplane; a landing wheel carried by the lower end of and supported by the strut; and a braking element for the landing wheel; self-energizing hydraulic mechanism for operating said element comprising, a reservoir for fluid, a pump adjacent the lower end of the strut, gearing driven by the landing wheel for driving the pump, a brake control valve, a connection between the pump and the valve, and a connection for returning excess fluid from the pump to the reservoir including an unloading valve, all of said mechanism being mounted on the strut; and manually operable remote control means for the brake control valve for controlling the actuation of the braking element.

6. In a landing gear for aircraft; a strut on an airplane; a landing wheel carried by the lower end of and supported by the strut; a braking element for the landing wheel; self-energizing hydraulic mechanism for operating said element comprising, a reservoir for fluid, a pump adjacent the lower end of the strut, gearing driven by the landing wheel for driving the pump, a brake control valve, a connection between the pump and the valve including a uni-directional flow valve, and a connection for returning excess fluid from the pump to the reservoir, all of said mechanism being mounted on the strut; and manually operable remote control means for the brake control valve for controlling the actuation of the braking element.

7. In a landing gear for aircraft; a strut on an airplane; a landing wheel carried by the lower end of and retractably supported by the strut; a braking element for the landing wheel; self-energizing hydraulic mechanism for operating said element comprising, a reservoir for fluid, a pump adjacent the lower end of the strut, gearing driven by the landing wheel for driving the pump, a brake control valve, a connection between the pump and the valve including a uni-directional flow valve and an expansion chamber, and a connection for returning excess fluid from the pump to the reservoir, all of said mechanism being mounted on the strut; and manually operable remote control means for the brake control valve for controlling the actuation of the braking element.

8. In a landing gear for aircraft; a strut on an airplane; a non-rotatable axle carried by and projecting from one side of the lower end of the strut; a landing wheel provided with a brake drum; a hydraulically shiftable drum engaging element; self-energizing hydraulic brake mechanism comprising, a reservoir for fluid, a pump, gearing for driving the pump and the landing wheel when the wheel is engaged with the ground, valve means for controlling fluid for operating said element, and connections for circulating fluid from the reservoir to the pump and from the pump to the valve means and the reservoir, said pump, reservoir, valve means and connections being mounted on the strut; and a manually shiftable remote control connection for shifting the valve means and controlling the actuation of the element.

9. In a landing gear for aircraft; a strut on an airplane; a non-rotatable axle carried by and projecting from one side of the lower end of the strut; a landing wheel provided with a brake drum; a hydraulically shiftable drum engaging element; self-energizing hydraulic brake mechanism comprising, a reservoir for fluid, a pump, gearing for driving the pump and the landing wheel when the wheel is engaged with the ground, valve means for controlling fluid for operating said element, and connections for circulating fluid from the reservoir to the pump and from the pump to the valve means and the reservoir, said pump, reservoir, valve means and connections being mounted on the strut, the valve means being mounted on the side of the strut opposite the axle; and a manually shiftable remote control connection for shifting the valve means and controlling the actuation of the element.

10. In a landing gear for aircraft; a strut on an airplane; a non-rotatable axle carried by and projecting from one side of the lower end of the strut; a landing wheel provided with a brake drum; a hydraulically shiftable drum engaging element; self-energizing hydraulic brake mechanism comprising, a reservoir for fluid, a pump, gearing for driving the pump and the landing wheel when the wheel is engaged with the ground, valve means for controlling fluid for operating said element, connections for circulating fluid from the reservoir to the pump and from the pump to the valve means and the reservoir, an expansion chamber in the connection between the pump and the valve means, said pump, reservoir, valve means and connections being mounted on the strut, the valve means being mounted on the side of the strut opposite the axle; and a manually shiftable remote control connection for shifting the valve means and controlling the actuation of the element.

CARLOS B. LIVERS.